May 31, 1927.
D. M. LUEHRS
1,630,956
LIQUID HEAT TRANSMISSION SYSTEM
Filed Oct. 6, 1924
2 Sheets-Sheet 1
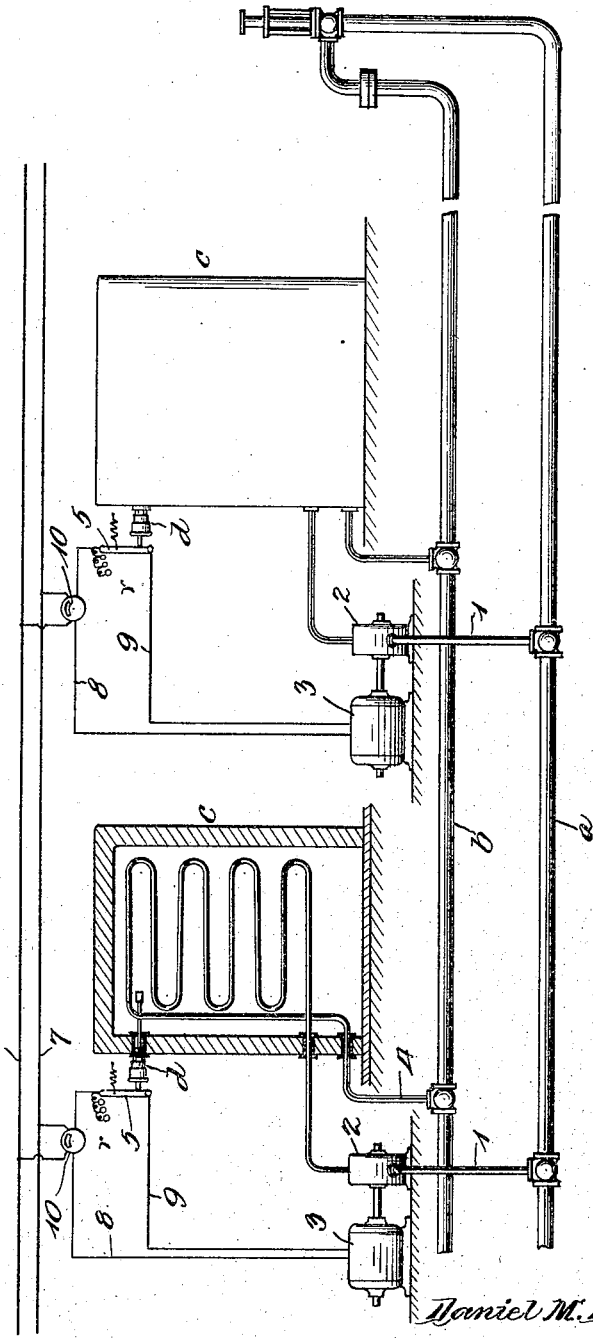

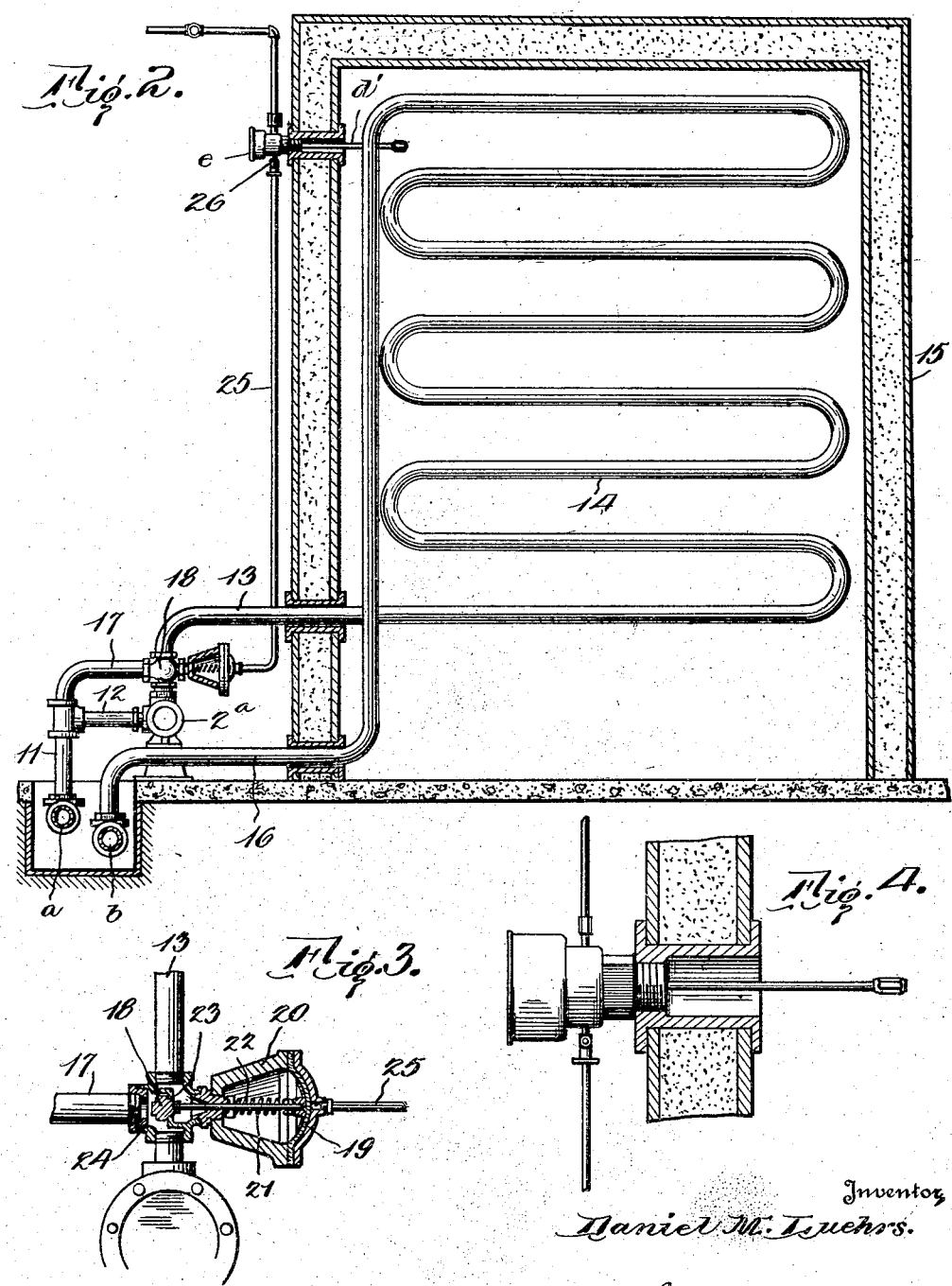

Patented May 31, 1927.

1,630,956

UNITED STATES PATENT OFFICE.

DANIEL M. LUEHRS, OF CLEVELAND, OHIO.

LIQUID HEAT-TRANSMISSION SYSTEM.

Application filed October 6, 1924. Serial No. 742,016.

This invention relates to improvements in means for distributing heat to heat-utilizing apparatus through the medium of high flash mineral oil, which is heated to a high degree and pumped through distributing pipes as described in my co-pending application Serial Number 700,205; filed March 19, 1924. The present improvements relate more particularly to means for increasing the pressure of the oil, in the individual heat-utilizing devices, above the normal pressure in the distributing pipes when the oil in the coils of the individual heat-utilizing device has been chilled and has become viscous and sluggish in its movement as when said device has been opened and filled with cold material which is to be heated. The invention also relates to means for controlling the quantity of oil circulated through the heat-utilizing apparatus to control the temperature therein.

In carrying out the invention, I provide in the branch pipes which extend from the main distributing pipes to each heat-utilizing apparatus, a pump for forcing the oil through the coils or jacket of the apparatus, and a thermostatic device, in one form of the invention, controls the operation of the pump, and in another form controls a bypass valve for shunting more or less of the oil around the pump. If the oil in the coils or jacket of an individual heat-utilizing apparatus is chilled, the arrangement is such that the pump will operate to apply a pressure to the oil above that existing in the distributing pipes and thus the apparatus will heat more quickly than if only affected by the pressure in the distributing pipes. After the apparatus has become heated, the thermostatic controlling device will cause the individual pump to vary the supply of oil so as to maintain the desired temperature in the apparatus.

In the accompanying drawing,

Fig. 1 is a diagrammatic view illustrating my invention in connection with a motor operated pump, in which the speed of the motor is controlled by a thermostatic device in the heat-utilizing apparatus;

Fig. 2 is a vertical section through a baking oven showing a pump for forcing the oil through the heating coils of the oven, and a by-pass valve, thermostatically controlled, for regulating the amount of oil passed through the coils;

Fig. 3 is an enlarged sectional view through the by-pass valve; and,

Fig. 4 is a section through a part of the oven wall, showing the thermostatic device which controls the flow of air for operating the by-pass valve.

Referring to Fig. 1 of the drawing, $a$ represents a pipe through which hot oil is forced from a suitable heater, as illustrated in my co-pending application above mentioned, and $b$ represents the return pipe of the distributing system. Connected at various points along the distributing pipes are heat-utilizing devices $c$, which may be baking ovens provided with heating coils or jacketed vessels, or apparatus of any kind where heat is required. A pipe 1 leads to each heat-utilizing device through a pump 2, which, as shown in Fig. 1, is preferably a rotary pump connected to an electric motor 3. From the pump 2, a pipe extends into the jacket or coils in the heat-utilizing device and returns through branch pipe 4 to the main return pipe $b$ of the system. A suitable thermostatic device $d$ is arranged in the upper part of each heat-utilizing apparatus, and in Fig. 1, this thermostatic device operates the arm 5 of a rheostat $r$, connected in the armature circuit of the motor. In the drawing, 6 and 7 represent the supply wires of an electric power system and the motors which operate the pumps associated with the heat-utilizing apparatus are connected to these supply wires through conductors 8 and 9, respectively, and through manually operable switches 10.

In the operation of the apparatus shown in Fig. 1, the switch being closed and the oven or other heat-utilizing apparatus being cool, the rheostat arm will occupy the position shown and the motor will operate and cause the pump to force the hot oil, at a pressure above the normal pressure in the distributing pipes, through the coils of the heat-utilizing apparatus. This will cause the oil to circulate freely and thus the apparatus will heat quickly. When the temperature in the apparatus reaches the desired degree, the thermostatic device will gradually move the rheostat arm to the left and insert resistance in the motor circuit, which will slow down the motor and thereby cause the pump to force less oil through the apparatus. If the temperature in the apparatus falls, the thermostat will cause the rheostat arm to move in the opposite direction and increase the speed of the motor and the pump will then deliver oil at a faster rate to the apparatus, causing the temperature therein to rise. After the contents and walls of the heat-utilizing apparatus become heated to the desired degree, the rheostat arm will be held in a balanced position which will cause the motor to run at a constant speed and the pump will deliver a constant quantity of oil, to keep the contents of the apparatus at a constant temperature.

In Fig. 2, I have shown an apparatus suitable for use with a pump which is driven at constant speed, the flow of oil through the apparatus being controlled by a by-pass valve which is automatically operated. In Fig. 2, $2^a$ represents a pump which may be operated by any suitable means at a constant speed. The oil from the main distributing pipe $a$ passes through pipes 11 and 12 to the intake side of the pump and from the pressure side of the pump the oil flows through pipe 13 to the coils 14 within the chamber 15, and returns through pipe 16 to the return pipe $b$ of the distributing system. A by-pass connection 17 is arranged between the pressure side of the pump and the intake pipe 12 and this connection is controlled by a valve 18, which is operable by a diaphragm 19 to open and close the by-pass and also to open and close the passageway from the pump to the pipe 13. The diaphragm 19 is contained within a chamber 20, and a valve stem 21 connects the diaphragm with the valve. A spring 22, coiled around the valve stem, normally presses the diaphragm outwardly, as shown in Fig. 3, and holds the valve 18 against the seat 23, thereby cutting off the flow of oil from the pump to the pipe 13 and heating coil 14. When the diaphragm is pressed to the left, in the manner hereinafter described, the valve opens the passageway for the flow of oil from the pump to the heating coil, and in the extreme left hand position of the valve, the latter fits against the seat 24 and closes the end of the by-pass connection 17 so that no oil can be by-passed around the pump. In the intermediate position of the valve, the flow of oil will be divided between the by-pass connection and the pipe 13 leading to the heating coil.

For operating the valve, I provide a pipe 25, leading from a suitable source of compressed air to the chamber 20, and when air is admitted to this pipe, the diaphragm and valve will be forced to the left, in Fig. 3, and when the air is released from the pipe 25, the diaphragm and valve will return to the positions shown in said figure. The flow of air from the air-compressing apparatus or reservoir through the pipe 25 is controlled by a valve $e$, which is operated by a thermostat $d'$, and a vent opening 26 is arranged in the pipe 25 between the valve $e$ and the casing 20. The purpose of this vent opening is to permit the air to leak slowly out of the pipe 25 when the valve $e$ is closed.

In the operation of the apparatus shown in Fig. 2, when it is desired to heat the contents of the chamber 15, the pump is started and air under pressure is admitted to the chamber 20 through the valve $e$, which is normally open. This pressure against the diaphragm forces the valve 18 against the seat 24 and closes the by-pass around the pump, at the same time opening the connection from the pump to the pipe 13 and coil 14. While the temperature in the chamber is low the oil in the coil loses heat rapidly and becomes more viscous than the oil in the distributing pipes. The pump associated with the apparatus forces the viscous oil through the coil more rapidly than the oil would flow with only the pressure in the distributing pipes, and hence the chamber and its contents will heat rapidly. When the temperature in the chamber reaches a predetermined degree, the thermostatic valve will operate to gradually close the valve $e$ and cut off the supply of compressed air from the chamber 20. Assuming the valve $e$ to be completely closed, the air pressure in the pipe 25, leading to the back of the diaphragm, will be relieved by leakage at the vent 26 and the spring 22 will then cause the valve 18 to close the connection to the heating coil and leave the by-pass connection wide open. The thermostatic valve operates gradually and in the practical use of the apparatus, when the contents of the chamber become heated to the desired degree, this valve will permit a sufficient air pressure to be maintained in the pipe 25 to cause the diaphragm valve to assume a stationary intermediate position in which a part of the hot oil will flow through the coils of the heating chamber and part will pass through the by-pass connection. This, of course, is assuming that the temperature required in the heating chamber is considerably lower than the temperature of the oil in the distributing pipes.

It will be evident that if the temperature in the main distributing pipe falls or rises, the controlling apparatus described will compensate for this rise or fall in temperature, and the speed of the motor, in Fig. 1, and the setting of the by-pass valve in Fig. 2, will be automatically adjusted according to such variations in temperature of the oil in the distributing system.

What I claim is:

1. The combination with the supply and return pipes of a hot oil distributing system, of a heat-utilizing apparatus, a branch pipe connecting said apparatus with the supply and return pipes, and a pump connected in said branch pipe for forcing the oil through the latter.

2. The combination with the supply and return pipes of a hot oil distributing system, of a heat utilizing apparatus, a branch pipe connecting said apparatus with the supply and return pipes and a pump connected in said branch pipe and adapted to force oil therethrough, and means controlled by the temperature in the apparatus for regulating the quantity of oil circulated through the apparatus by the pump.

3. The combination with the supply and return pipes of a hot oil distributing system, of a heat utilizing apparatus, connected to said pipes, a pump associated with the apparatus and adapted to force oil therethrough, a by-pass connection around the pump, a valve for controlling the flow of oil through the apparatus and the by-pass connection, and means controlled by the temperature in said apparatus for adjusting the position of said valve.

4. The combination with the supply and return pipes of a hot oil distributing system, of a heat utilizing apparatus, connected to said pipes, a pump associated with the apparatus and adapted to force oil therethrough, a by-pass connection around the pump, a valve for controlling the flow of oil through the apparatus and the by-pass connection, a device operable by fluid pressure for actuating said valve, a pipe for conveying fluid under pressure to said device, a valve in said pipe, and a thermally operated device associated with said apparatus for operating said latter valve.

5. The combination with the supply and return pipes of a hot oil distributing system, of a heat utilizing apparatus, connected to said pipes, a pump associated with the apparatus and adapted to force oil therethrough, a by-pass connection around the pump, a valve for controlling the flow of oil through the apparatus and the by-pass connection, said valve being normally in position to by-pass the oil, pneumatically operated means for moving said valve in the direction to close the by-pass connection, and a thermally operated device associated with the apparatus for controlling said means.

In testimony whereof I hereunto affix my signature.

DANIEL M. LUEHRS.